(12) United States Patent
Welle

(10) Patent No.: US 9,876,267 B2
(45) Date of Patent: Jan. 23, 2018

(54) ANTENNA DEVICE AND METHOD FOR OPERATING AN ANTENNA DEVICE

(71) Applicant: VEGA GRIESHABER KG, Wolfach (DE)

(72) Inventor: Roland Welle, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 15/354,751

(22) Filed: Nov. 17, 2016

(65) Prior Publication Data

US 2017/0141454 A1    May 18, 2017

(30) Foreign Application Priority Data

Nov. 17, 2015 (EP) ..................... 15194998

(51) Int. Cl.
| | |
|---|---|
| *G01F 23/00* | (2006.01) |
| *H01Q 1/22* | (2006.01) |
| *H04B 17/10* | (2015.01) |
| *G01B 15/04* | (2006.01) |
| *G01F 23/284* | (2006.01) |
| *H01Q 21/00* | (2006.01) |
| *H01Q 3/24* | (2006.01) |

(Continued)

(52) U.S. Cl.
CPC ............ *H01Q 1/225* (2013.01); *G01B 15/04* (2013.01); *G01F 23/284* (2013.01); *G01S 7/03* (2013.01); *G01S 13/34* (2013.01); *G01S 13/426* (2013.01); *G01S 13/88* (2013.01); *G01S 13/89* (2013.01); *H01Q 3/24* (2013.01); *H01Q 3/26* (2013.01); *H01Q 19/175* (2013.01); *H01Q 21/00* (2013.01); *H01Q 21/065* (2013.01); *H01Q 21/08* (2013.01); *H04B 17/103* (2015.01)

(58) Field of Classification Search
CPC ........................................ G01V 3/12
See application file for complete search history.

(56) References Cited

U.S. PATENT DOCUMENTS

| | | | |
|---|---|---|---|
| 2008/0100510 A1 * | 5/2008 | Bonthron | ................ G01S 7/024 342/373 |
| 2008/0258964 A1 | 10/2008 | Schoeberl et al. | |

(Continued)

FOREIGN PATENT DOCUMENTS

| | | |
|---|---|---|
| DE | 10 2004 059 915 A1 | 6/2006 |
| DE | 10 2007 039 897 B3 | 10/2008 |

(Continued)

*Primary Examiner* — Kiho Kim

(74) *Attorney, Agent, or Firm* — Oblon, McClelland, Maier & Neustadt, L.L.P.

(57) ABSTRACT

An antenna device is disclosed including a control means and at least two transmission means in predeterminable positions and at least two receiving means in predeterminable positions. The control means is set up in such a way that it alternately individually excites the at least two transmission means in transmission, in such a way that each of the at least two receiving means receives a transmitted signal generated by each of the at least two transmission means. The control means is further set up to excite the at least two transmission means jointly in transmission at a predeterminable moment in such a way that each of the at least two receiving means receives a transmission signal generated by a single virtual transmission means.

13 Claims, 6 Drawing Sheets

(51) Int. Cl.
| | | |
|---|---|---|
| H01Q 3/26 | (2006.01) | |
| H01Q 19/17 | (2006.01) | |
| H01Q 21/06 | (2006.01) | |
| H01Q 21/08 | (2006.01) | |
| G01S 7/03 | (2006.01) | |
| G01S 13/34 | (2006.01) | |
| G01S 13/42 | (2006.01) | |
| G01S 13/88 | (2006.01) | |
| G01S 13/89 | (2006.01) | |

(56) References Cited

U.S. PATENT DOCUMENTS

| | | | |
|---|---|---|---|
| 2008/0303711 A1* | 12/2008 | Matsuoka | G01S 3/32 342/196 |
| 2009/0051593 A1 | 2/2009 | Wiesbeck et al. | |
| 2011/0122026 A1* | 5/2011 | DeLaquil | H01Q 3/2682 342/372 |
| 2015/0103630 A1 | 4/2015 | Bartov et al. | |
| 2015/0333884 A1* | 11/2015 | Athley | H04L 5/0048 375/295 |

FOREIGN PATENT DOCUMENTS

| | | |
|---|---|---|
| DE | 10 2014 200 038 A1 | 7/2015 |
| WO | WO 2010/144936 A1 | 12/2010 |
| WO | WO 2015/120879 A1 | 8/2015 |
| WO | WO 2015/120885 A1 | 8/2015 |

* cited by examiner

ANTENNA DEVICE AND METHOD FOR OPERATING AN ANTENNA DEVICE

REFERENCE TO RELATED APPLICATIONS

This application claims the benefit of the filing date of European Patent Application No. 15 194 998.9 filed on 17 Nov. 2015, the disclosure of which is hereby incorporated herein by reference.

FIELD OF THE INVENTION

The present invention relates to the technical field of measurement technology. In particular, the present invention relates to an antenna device, to a method for operating an antenna device, and to a program element for operating an antenna device.

BACKGROUND

To determine the level of a filling material or bulk material in a container, topology-detecting level measuring instruments may be used. These measuring instruments scan the filling material and/or bulk material surface using an electronic signal, and can further make use of the knowledge, derived from the scanning, of the three-dimensional surface topology of the filling material and/or bulk material, so as to determine the volume of the filling material, assuming a known area under the filling material, and/or the mass, in the event of a known density, or further variables derivable therefrom. For scanning, a beam of an electromagnetic wave is passed over the filling material or bulk material, and the reflection properties at different angles are considered and evaluated.

A bulk material may be a particulate or chunky mixture which is in a pourable form. The properties of bulk material can be determined using the particle size and the particle distribution as well as the bulk density, the dumping angle, the humidity and the temperature. A bulk material may be a material accumulation on an unbounded area or within a container.

A filling material may generally denote a material which is filled into a container. This may be a bulk material or else a liquid. In particular in the case of liquids, uneven surfaces can be formed owing to vibrations, which lead for example to the formation of wavy surfaces.

A three-dimensional (3D) level measurement or a topology measurement using electromagnetic waves, in particular using radar signals, may open up new application goals in the measurement of materials. In bulk material measurements, for example, often only rough measurement results for the current fill height can be determined. The imprecise specification of the measurement values may be due to the random distribution of the accumulation of a bulk material or filling material. As a result of the three-dimensional level measurement, because of the possibility of detecting the volume and/or the mass of the bulk material accumulated on an area or of the bulk material contained in a container, a high quality of measurement can be achieved. This high quality may be achieved in that the surface of the object, measurement object, bulk material and/or filling material is determined, and the volume, the material and/or the mass of the object is determined therefrom to a good approximation using known variables for the consistency of the bulk material.

DE 10 2007 039 397 B3 discloses a method for operating an antenna array comprising a plurality of transmitters and a plurality of receivers and an associated device.

WO 2015/052699 A1 relates to a method for evaluating a content of a container using a plurality of acoustic transceiver arrays.

WO 2015/120885 A1 relates to a measurement device and to a method for detecting properties of an object.

SUMMARY OF THE INVENTION

In one aspect of the present invention, an antenna device, a method for operating an antenna device, a level measuring instrument and a program element for operating an antenna device as well as a computer-readable storage medium for operating an antenna device may be provided.

It may be desired to make effective measurement of levels possible.

The subject matter of the invention is set out in the independent claims. Further embodiments of the invention may be derived from the dependent claims and the following description.

In one aspect of the present invention, an antenna device is disclosed which comprises a controller (also denoted as control means) and an antenna array. The antenna array comprises at least two transmission devices (also denoted as transmission means) in predeterminable positions and at least two receiving devices (also denoted as receiving means) in predeterminable positions. In one example, the antenna array may take the form of a linear antenna array. In another example, the antenna array may take the form of a two-dimensional antenna array having a planar expanse. As a result of the arrangement of the transmission means and receiving means in predeterminable positions, the relative positions of the transmitter and receiver may be known, including in particular a distance between these elements.

The control means is set up in such a way that it alternately individually excites the at least two transmission means in transmission, in such a way that each of the at least two receiving means receives a transmitted signal generated by each of the at least two transmission means. In one example, it may be provided that only exactly one transmission means ever transmits at the same time, in such a way that substantially no superposition of the signals emitted by the at least two transmission means can occur. In this way, it can be ensured that each receiving means substantially only receives a signal from a defined transmission means, and that the signal source of each signal can be substantially determined. As an alternative or in addition to the alternating transmission, coding of the signal may be provided, in such a way that the source of the signal can be identified by way of the coding.

The control means is further set up to excite the at least two transmission means in transmission substantially jointly and/or simultaneously at a predeterminable moment. In the case of a plurality of transmission means, a subset of transmission means may be excited in joint transmission. The subset comprises the at least two transmission means. In one example, it may be provided that the transmission means generate coherent signals, in such a way that for example at a predeterminable distance from the at least two transmission means, a superposition of the coherent signals occurs in such a way that the resulting signal appears to originate from a single source. As a result of the signal superposition of the transmitted signal in a far field, the substantially joint excitation of the at least two transmission means may result in each of the at least two receiving means receiving a received signal which appears to originate from a single virtual transmission means. In other words, it may not be possible for the at least two receiving means to distinguish by way of the received signal whether this signal originates from a single virtual source or from at least two different sources which are actually present and of which the transmitted signals have been superposed to form a single received signal. The superposition may give the appearance that the "virtual" signal originates from the single "virtual" source, which is located in a different position from the position of each of the at least two transmission means.

In the context of the present text, for the sake of simplicity, the terms transmitted signal and received signal may be used equivalently, and so the properties disclosed for the transmitted signal also apply to the received signal and vice versa.

The virtual transmission means may be arranged in a predeterminable virtual position and/or appear in this predeterminable position. A virtual position may be a position where an element is not actually present, but where an element appears to be present. The virtual position differs from the predeterminable positions in which the at least two transmission means and/or the at least two receiving means are arranged. For example, the virtual position may occur centrally between the predeterminable positions of the two transmission means or at a centre of gravity of the at least two transmission means. In another example, in addition or as an alternative to the assembly positions of the transmission antennae and/or receiving antennae, the transmitted signals used and the characteristics of the antennae may also be influenced so as to set the position of a virtual transmission means.

In another aspect of the present invention, a level measuring instrument for determining a level and/or for determining a surface structure of an object comprising an antenna device according to the invention is provided.

In yet another aspect of the present invention, a method is disclosed for operating an antenna device which comprises an antenna array having at least two transmission means, which are arranged in predeterminable positions, and at least two receiving means, which are arranged in predeterminable positions. The positions of the at least two transmission means and the positions of the at least two receiving means may all differ from one another, in such a way that each transmission means or receiving means is arranged unambiguously in a predeterminable position. In one example, in which transceiver means are used, the position of each transmission means may be identical to the position of the associated receiving means.

The method further comprises alternately exciting the at least two transmission means in such a way that each of the at least two receiving means receives a transmitted signal generated by each of the at least two transmission means. The method further comprises exciting the at least two transmission means in joint transmission at a predeterminable moment in such a way that each of the at least two receiving means receives a transmitted signal generated by a single virtual transmission means. In other words, this may mean that although the at least two transmission means are excited jointly and/or simultaneously in transmission, because of the physical arrangement and phase position of the emitted transmitted signals, superposition may occur at the respective positions of the receiving means in such a way that the received signals for each of the at least two receiving means appear to originate from a single source. The virtual transmission means may be arranged in a predeterminable position, in particular appear to be arranged there. This predeterminable position differs from the predeterminable positions of the at least two transmission means and/or of the at least two receiving means so as to simulate an additional signal source in a different position. In other words, as a result of the joint transmission of the at least two transmission means, a single virtual transmission means may appear in positions which are still unoccupied by the at least two transmission means and/or the at least two receiving means. As a result, the virtual transmission means may be captured as an additional transmission means, which has substantially the same properties as each of the two transmission means has per se.

In another example, more than two transmission means may be operated alternately during a first phase of a measurement cycle and jointly during a second phase of a measurement cycle, so as to create an additional virtual transmission means as a result of the joint operation. It may also be possible to create further, additional virtual transmission means in this manner, in such a way that it is possible to transmit using at least one or a plurality of virtual transmission means. The virtual transmission means may, in time-multiplexed operation, be operated alternately or jointly. In yet another example, the method for operating an antenna device, which comprises at least two transmission means in predeterminable positions and at least two receiving means in predeterminable positions, may comprise exciting the at least two transmission means in transmission in accordance with a predeterminable first time scheme. The first time scheme may be predetermined in such a way that the signals generated by the at least two transmission means, when received by the at least two receiving means, can each be assigned to one of the at least two transmission means. Further, the method may comprise exciting the at least two transmission means in transmission in accordance with a predeterminable second time scheme, in such a way that the signals generated by the transmission means, when received by the at least two receiving means at a predeterminable distance from the transmission means, appear to originate from a single virtual transmission means. The first and the second time scheme may each be a periodic time scheme and repeat after a predeterminable period length.

Further, the method may comprise receiving received signals while the predeterminable first time scheme is active and also receiving received signals while the predeterminable second time scheme is active. Since it is known in which active time scheme each received signal was received, it may be possible to assign each of the received signals to the first and/or second time scheme. As a result of the assignment to a time scheme, it can be determined whether a received signal is a signal originating from a single signal source or whether it is a signal originating from a virtual signal source or virtual transmission means. The virtual transmission means may be emulated by at least two or a plurality of signal sources, which are active simultaneously and which, as a result of the mode of operation, give the appearance of originating from a single signal source.

The method may further provide that an echo curve for a predeterminable spatial direction is formed from the known information, such as the predeterminable time scheme, the predeterminable positions of the transmission means and/or the predeterminable positions of the receiving means, using the signals received during the first time scheme and during the second time scheme. It may in particular also be possible to form a plurality of first echo curves for a plurality of first spatial directions using the echo curves detected during the first time scheme, using digital beamforming methods. It may additionally be possible to form a plurality of second echo curves for a plurality of second spatial directions using the echo curves detected during the second time scheme. The plurality of first spatial directions may be different from the plurality of second spatial directions, it being possible for the plurality of first spatial directions to be a subset of the plurality of second spatial directions. A spatial direction may also be referred to as a primary receiving direction.

It should be noted that the transmission means and the receiving means can be operated or manufactured independently of one another. A link may be provided by the respective evaluation means by assigning the signals to time ranges, time intervals or time schemes. The transmission means and the evaluation means may also be operated substantially independently of one another.

In another aspect of the present invention, a program element for operating an antenna device is provided, which, when it is executed by a processor, carries out the method according to the invention for operating an antenna device.

In another aspect of the present invention, a computer-readable storage medium is provided, on which a program code is stored, which, when it is run by a processor, carries out the method according to the invention.

An antenna device may for example be used in a method for determining a surface of the object. By means of the antenna device, a beam of an electromagnetic wave may be deflectable in various spatial directions or receivable from various spatial directions without a mechanical movement of the antenna device having to be carried out. Phase differences in the received signals are evaluated by mathematical methods according to the position of the transmission and/or of the receiving. The deflection may therefore take place substantially mathematically and non-mechanically. As a result of a mathematical or electronic deflection of this type by mathematical methods, beam guidance or scanning of an object in various spatial directions may be possible. The scanning is equivalent to a movement of a beam in various spatial directions. A linear arrangement of antenna elements or antenna patches, for example of transmission means and/or receiving means, may make linear beam guidance along an object possible. A two-dimensional arrangement may make two-dimensional beam guidance possible.

In one example, however, mechanical movement of an antenna device may also be used in combination with an electronic change in the spatial direction of a beam of an electromagnetic wave. Methods which are capable of emitting electrical beams in different spatial directions and/or receiving them from various spatial directions are referred to as digital beamforming (DBF) methods. The beam deflection can be used for example so as to scan the surface of an object, for example the surface of a filling material and/or a bulk material, and to reach conclusions regarding the volume and/or mass of the object on the basis of the three-dimensional calculated structure. In turn, from the determined volume and/or the determined mass, conclusions can be reached regarding the level, in particular if further physical properties of the object are known.

It may be desired for a level measuring instrument to be able to measure a level reliably substantially in spite of unfavourable ambient conditions.

The electronic scanning, in particular if an antenna device is used which comprises an arrangement in the form of a two-dimensional array, can make it possible to dispense substantially entirely with movable elements of a level measuring instrument. Merely through mathematical operations and the received reflections of an emitted electromagnetic signal or electromagnetic wave, a scanning beam can be moved using digital beamforming methods. As a result of the movement of the scanning beam without mechanical components, a stationary antenna array or a stationary antenna device can contribute to reliable level measurement.

By means of the present invention, it may be possible to emulate a single or a plurality of additional antennae. By emulating the additional antenna, a virtual array having good receiving properties can be formed. A virtual array or a co-array can be formed by way of temporally alternating operation of the transmission means and corresponding evaluation of the received signals. Forming a virtual array by providing an additional transmission means in the form of the virtual transmission means may contribute to forming receiving arrays or co-arrays having wide and/or densely occupied antenna areas and/or apertures as a result of the selected mode of operation. In determining the positions of the elements of a co-array, in one example digital folding or discrete folding of positions of the transmission elements with the positions of the receiving elements may be used. The formation of co-arrays can be used to form predeterminable shapes of receiving arrays. The formation of co-arrays by means of virtual transmission means can contribute to widening the opening or aperture of the formed virtual array. This widening of the aperture can be used during operation of a virtual array for a good signal-to-noise ratio (S/N) and/or for a good angular resolution of the antenna device. Thus, providing the antenna device according to the invention in the operation of a topology-detecting level measuring instrument can ensure a high likelihood of detection for the level. In addition, forming a virtual array using virtual transmission means can limit a hardware outlay for implementing an antenna device and contribute to low costs in implementing the topology-detecting level measuring instrument or the 3D level measuring instrument. The costs may turn out low because a virtual, in other words not actually present, additional transmission means is used to increase the aperture of the resulting virtual array or of the co-array and/or to reduce the distance between the elements of the co-array. A level measuring instrument equipped with a plurality of transmission antennae or transmission means, which are operated individually or else in groups by time multiplexing, can provide a high measurement precision.

A level measuring instrument which is equipped with an antenna device comprising at least two transmitters or at least two transmission means for topology-detecting level measurement, may be actuated differently in two different operating phases. This actuation may provide that the at least two transmission means are actuated or activated in such a way that the measuring instrument activates at least one of these at least two transmission means in a first operating phase and that the measuring instrument jointly activates at least two of the at least two or plurality of transmission devices which are present in total in a second operating phase. As a result of the controlled process, the need to mark the transmitted signals so as to distinguish them can be avoided. For example, coding the transmitted signals to distinguish them from different transmitted signals can be avoided. In other words, in one aspect of the present invention, the operation of a topology-detecting level measuring instrument may provide that in a first operating phase, the transmission means are actuated in such a way that at least two active transmission means can be distinguished, for example by a time-multiplexing method, which is used as an alternative to a coding method by which it is also possible to distinguish the sources.

In addition to the first operating phase, a measurement cycle may comprise a second operating phase in which at least two transmission means are operated in the same manner, in such a way that in the event of superposition, the transmitted signals generated thereby are substantially indistinguishable or appear to originate from a single source, since they are for example of the same form, in other words non-coded or uncoded.

In another example, in a first operating phase of the actuation of the antenna device, a plurality of echo curves may be detected according to individually actuated transmission means, and in a second operating phase, a plurality of echo curves may be detected according to jointly actuated transmission means. The individual operating phases may be subdivided into individual moments or time intervals, in each of which precisely one transmission means and/or at least two transmission means simultaneously are activated. As a result of the activation of the transmission means being assigned to moments, time intervals and/or operating phases, it may be possible to assign the detected echo curves to the respective operating phases or moments. In addition, after passing through the first and second operating phase, a third operating phase may be provided, during which the first echo curve and the second echo curve are jointly evaluated so as to determine a topology or a value derived therefrom, for example a level. During this third operating phase, it is possible for no activation and no receiving to take place, and instead for a single or a plurality of echo curves for a single or a plurality of different spatial directions to be determined by digital beamforming methods. In one example, the third operating phase may run in parallel with at least one of the first operation phase and/or the second operating phase.

In another example, a level measuring instrument may be disclosed which uses the antenna device, it being possible for the level measuring instrument to be set up in such a way that it switches into a pure level measurement mode when it detects a deterioration in reflection conditions. To change into the pure level measurement operation, substantially only the second operating phase may be carried out, and the first operating phase may be skipped. In the second operating phase, the number of jointly operated transmission means may be increased so as to use as many transmission means as possible and so as to increase the signal strength. In the second operating phase, at least two transmission means may be activated simultaneously so as to generate a transmitted signal and so as to receive this transmitted signal using at least two receiving means so as to make digital beamforming possible.

As well as using digital beamforming methods, the antenna device, in particular the method for operating the antenna device, may also comprise actuating a plurality of transmission elements or transmission means in succession in a time-multiplexing method and activating the transmission means jointly by providing a further operating phase, so as to form a virtual array having few physical components. The position of the operating phase of simultaneously activating the transmission means can be arranged as desired within a measurement cycle. As a result of this additional operating phase and as a result of the simultaneous and uniform use of a subset of provided transmission means or of all transmission means, the surface topology of a bulk material can be detected with high precision. This high precision may be achieved substantially without additional hardware and without additional cost or weight. The simultaneous operation of at least two transmission means during an operating phase within the measurement cycle can result in multiplication of the transmission energy towards the medium to be measured or surface topology to be measured, the multiplication of the transmission energy corresponding to the number of simultaneously active transmission means.

This increased energy emission can increase the achievable S/N, in particular in poorly reflective media. It may be provided to provide coherence of transmitted signals during the simultaneous emission thereof. It may also be provided to provide a predeterminable phase offset between the transmitted signals during the simultaneous emission, so as to achieve optimised, directed emission of energy towards the bulk material surface and thus maximisation of the signal energy received by the receiving antennae.

By contrast with digital beamforming for level measurement, in order to emulate an additional antenna for this purpose, it may be provided that substantially in-phase or coherent electromagnetic waves are generated. As a result of the emulated antenna being arranged in a predeterminable position between the provided transmission means and the provided receiving means, a virtual array or a co-array may be formed, in which for example aperture gaps are prevented and/or closed and/or in which the aperture is enlarged. It may in particular also be provided to decide during the operation of the level measuring instrument whether the transmission antennae are actuated in a mode which brings about closing of aperture gaps and thus prevention of grating lobes or whether the transmission antennae are operated in a different mode which leads to a larger aperture of the virtual array and thus to an improved angular resolution.

In a physical construction of an antenna device, by ensuring a maximum distance between adjacent elements, grating lobes can be prevented from forming. The maximum distance may mean that in the physical arrangement of the transmission means and receiving means within the antenna device a maximum distance between the elements of the co-array is to be provided, which is less than or equal to half the wavelength of the used transmitted signal, so as to prevent the formation of a grating lobe. This condition may be referred to as a distance criterion. The physical arrangement of the antenna elements results in the arrangement of a co-array in connection with the selected mode of operation, too, and/or the maximum distance between the elements of the co-array occurs. As a result of constantly increasing frequencies, so as to make antennae having smaller constructions for smaller container openings possible, the wavelengths of the used signals are selected so as to be smaller and smaller. So as nevertheless to make a large aperture of the antenna device possible and achieve good focussing of the antenna device, a correspondingly large number of constructional elements or antenna elements is required whilst adhering to the distance criterion. A physical increase in the number of transmission means and/or receiving means can be avoided by forming a virtual array or co-array. As a result of the time-multiplexed operation of a plurality of transmission means and the addition of an operating phase of simultaneously activating a plurality of transmission means, a generated virtual array having a large aperture can be created. This virtual array may also meet the distance criterion for preventing grating lobes, even though the physical array does not have a large aperture and does not meet the distance criterion. The virtual array or co-array results from the time-multiplexed operation of the transmission means and the simultaneous receiving activity of all of the receiving means.

It may be considered an aspect of the present invention to operate a level measuring instrument comprising an antenna device having at least two transmitters or having at least two transmission means in such a way that a control means activates at least one of the transmission means alone in a first operating phase and activates at least two of the provided transmitters simultaneously in a second operating phase. These two simultaneously activated transmitters or the plurality of simultaneously activated transmitters may generate transmitted signals which are substantially indistinguishable from one another. As a result of the use of digital beamforming and the avoidance of mechanical components, a level measuring instrument or measuring instrument comprising the proposed antenna device can be used in extreme conditions, for example in particularly dusty environments. Since no mechanical, moving components are used, the reliability can be increased by comparison with a topology-detecting level measurement device having a single antenna, the primary radiation direction of which is changed purely mechanically. In other words, in the antenna device according to the invention, the primary radiation direction may be changeable mathematically or electronically. Thus, as a result of the digital beamforming method, movement of an antenna device can be tracked.

In another aspect of the present invention, the antenna device comprises an evaluation means. The evaluation means is connected to the control means. The control means may further be set up in such a way that it determines the predeterminable moment at which the at least two transmission means are jointly excited in transmission by using at least two different time schemes or by using at least two operating phases. In order to implement the at least two different time schemes, the control means is set up to excite the at least two transmission means in transmission alternately in accordance with a predeterminable first time scheme, in such a way that the transmitted signals generated by the at least two transmission means can each be assigned to one of the at least two transmission means when received by the at least two receiving means. For this assignment, in one example the control means and the evaluation means are synchronised with one another. The first time scheme may be for example a time-multiplexing scheme, in which a predeterminable duration of the activation during the first time scheme is assigned to each of the at least two transmission means, in such a way that while one transmission means is activated, the other or the plurality of other transmission means is/are deactivated. In another example, the at least two transmission means may be distinguished by providing a different signal coding.

The transmission means is further set up to excite the at least two transmission means in transmission jointly in accordance with a predeterminable second time scheme, in such a way that transmitted signals generated by the at least two transmission means appear to originate from a single virtual transmission means when received by the at least two receiving means at a predeterminable distance from the transmission means. The virtual transmission means may be considered an independent, distinct transmission means.

The evaluation means is also set up to receive the received signals via the at least two receiving means while the predeterminable first time scheme is active and also while the predeterminable second time scheme is active. The evaluation means is further set up to form an echo curve for a predeterminable spatial direction from the predeterminable time schemes, from the predeterminable positions of the transmission means and/or from the predeterminable positions of the receiving means. The echo curve for a predeterminable spatial direction may be formed using the received signals received during the first time scheme and during the second time scheme. In order to form the echo curve, the evaluation means may establish which received signal has been received in which of the time schemes. When constructing the virtual array, the evaluation means takes into account which echo curves have been received in which time scheme. Thus, the echo curves of the first time scheme are taken into account in the digital beam formation whilst taking into account the physical positions of the transmitters. The echo curves received during the second time scheme, unlike the echo curves received during the first time scheme, are taken into account whilst taking into account the virtual transmitter position in the digital beamforming, the virtual transmitter position resulting from the physical positions of the transmitters which are activated simultaneously. Since the first and second time scheme can run in succession in any desired sequence, a total measurement cycle duration can be made up of the durations of the two time schemes. If a third operating phase is to be provided, a measurement cycle may also comprise this third operating phase.

An echo curve may specify the reflection properties of a transmitted signal and the reflection properties of an object in a predeterminable receiving direction. By varying the receiving direction, the surface of an object, fill level or bulk material can be scanned without the antenna device having to be moved. The echo curve may specify a measure of the distance of the surface of the object from a receiving means. By evaluating the different echo curves, the topology of the surface of the object can be computationally determined. If further details about the object are known, such as the material used in the object, the volume of the object and in particular the volume of a filling material and/or bulk material can be determined. The evaluation means may further be set up in such a way that it determines a value for a level from the individual echo curves which it determines for the various spatial directions.

In another aspect of the present invention, the predeterminable positions of adjacent transmission means and/or adjacent receiving means are arranged at a distance which is less than or equal to half the wavelength of the used signals.

Since the received signal is a reflected transmitted signal, the wavelength is based in particular on the wavelength of the used transmitted signal. The wavelength for the at least two transmission means is selected so as to be substantially equal, in such a way that the same wavelength is used as a basis for the antenna device. In one example, the wavelength is approximately 3.975 mm. If the transmission means and/or receiving means are arranged in a grid shape, the grid pattern may be based on the wavelength. A co-array is formed in such a way that the distance condition is adhered to.

In another aspect of the present invention, the evaluation means is set up to form a virtual array from the antenna array, in particular from the signals transmitted by the at least two transmission means and received by the at least two receiving means.

A virtual array may be formed from pure physical transmission and/or receiving means which are operated in time-multiplexed operation and from the arrangement of which the virtual array is calculated. A virtual array may be calculated if the array of receiving means is reproduced by carrying out digital folding in each position of a transmission means. To generate specially configured virtual arrays, an additional virtual transmission means and the associated received signals may also be incorporated into the calculation if a measurement cycle is correspondingly extended to a duration during which at least two transmission means or an array of transmission means are operated uniformly and simultaneously.

In another aspect of the present invention, the at least two transmission means are arranged with respect to a reference point, the virtual transmission means appearing to be positioned at the reference point.

The reference point may for example be positioned at half of the distance between the at least two transmission means. If these two transmission means are operated simultaneously using the same signal, a single virtual transmission means appears in the far field, in other words at a particular distance from the two transmission means, to be arranged in the reference point.

In yet another aspect of the present invention, the at least two transmission means generate a distinguishable transmitted signal by using a time-multiplexing method and/or by using a coding method. The use of a corresponding method may make it possible to identify the signal source by way of the signal in each case.

Since generating a virtual transmission means is dependent on the joint operation of at least two transmission means, it may be expedient to detect the predeterminable moment of switching from separate operation of the transmission means to joint or simultaneous operation of the transmission means. For this purpose, a first time scheme and a second time scheme may be used. A time-multiplexing method may make it possible to switch between the first time scheme and the second time scheme at a predeterminable moment. A coding method may make it possible to assign a received signal to the associated transmission means even in the event of simultaneous operation of the at least two transmission means. Thus, instead of a time scheme, a coding scheme may be switched over, and a coding method may be used during the separate operation, whereas the coding method is switched off during the uniform operation.

In another aspect of the present invention, the control means is set up to excite the at least two transmission means in transmission using a frequency-modulated continuous wave (FMCW) signal.

In another aspect of the present invention, at least one of the two transmission means and one of the at least two receiving means are implemented as a joint transceiver means, which can both transmit a signal and receive a signal.

The use of transceiver means may make it possible to save physical space in an antenna device.

In another aspect of the present invention, the total of the durations of the predeterminable first time scheme and the predeterminable second time scheme determines the duration of a measurement cycle. Since the second time scheme is appended to the first time scheme, the measurement cycle duration may be increased by comparison with pure time-multiplexing operation of an antenna. However, as a result of increasing the measurement cycle duration, a reduction in the construction size and/or in the number of components of an antenna array or antenna device may be achieved.

In another aspect of the present invention, the evaluation means may be set up to weight the received signals. Alternatively and/or in addition, the transmission means may be set up to weight the transmitted signals.

As a result of the emulation of an additional antenna, by emulating a virtual transmission means by operating at least two transmission means simultaneously, superpositions or signal amplifications of the resultant calculated signals of a co-array may occur in the signal evaluation, and may lead to imprecise measurement results. Weighting can reduce and/or prevent superposition of this type. One example of a weighting function may be a tapering function, for example a Hamming, Tylor or Blackman tapering function, which weights individual received signals of the at least two receiving means.

In another aspect of the present invention, the antenna device is configured as a two-conductor instrument, a power supply line also being used for transferring data.

For example, a level measuring instrument for detecting a topology is set up in such a way that the required power is exclusively drawn via a two-conductor connection. In particular, the control means and/or the evaluation means are configured as a two-conductor instrument. This two-conductor connection may also be configured for communication, in particular for outputting at least one measurement value or a measurement value derived therefrom, for example a level.

In another aspect of the present invention, a level measuring instrument for determining a level and/or for determining a surface structure of an object comprising an antenna device according to the invention is provided.

The small construction of the antenna device may also result in a small construction of the level measuring instrument, it simultaneously being possible to achieve high measurement precision as a result of the emulation of an additional transmission means.

In another example of the present invention, the evaluation means is set up to use a digital beamforming method.

Digital beamforming makes it possible, substantially without mechanical movement, to view a spatial region at various spatial angles by means of the antenna device and thus, without mechanical movement of the antenna device, to scan and detect a surface of an object or filling material. All possible primary radiation directions can be detected simultaneously within a single measurement.

It should be noted that different aspects of the invention have been disclosed with reference to different subject matters. In particular, some aspects have been disclosed with reference to device claims, whereas other aspects have been disclosed with reference to method claims. However, a person skilled in the art can derive from the above description and the following description that, unless disclosed otherwise, in addition to each combination of features belonging to one category of subjects, any combination of features relating to different categories of subjects is also considered to be disclosed by the text. In particular, a combination of features of device claims and features of method claims is also intended to be disclosed.

BRIEF DESCRIPTION OF THE DRAWINGS

In the following, further embodiments of the present invention are disclosed with reference to the drawings.

DETAILED DESCRIPTION OF EMBODIMENTS

Figure 1:
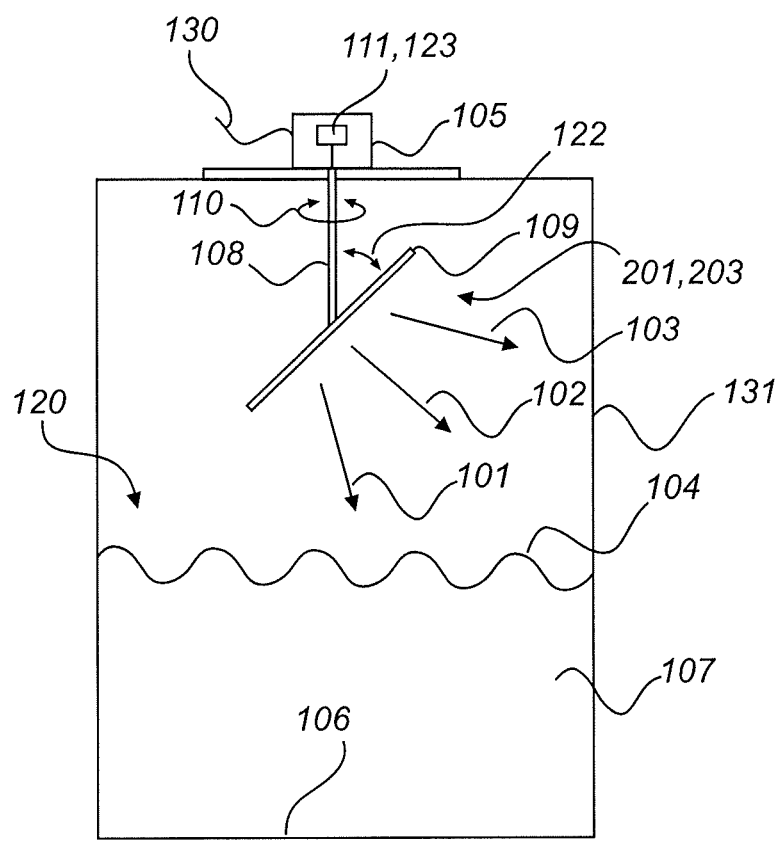
FIG. 1 shows a level measuring instrument comprising an antenna device in accordance with one embodiment of the present invention.

The drawings are schematic and not to scale. In the following description of FIGS. 1 to 11, like reference numerals are used for like or corresponding elements.

Without limiting the general applicability, the following description of the drawings basically discusses a linear antenna 201. However, the description and principles also apply accordingly to the two-dimensional array antenna 203.

FIG. 1 shows a level measuring instrument 105 or topology-detecting radar measuring instrument 105 in accordance with one embodiment of the present invention. The measuring instrument 105 or field instrument 105, in particular the level measuring instrument 105, is capable of detecting echo signals or echo curves from different angle ranges 101, 102, 103. The level measuring instrument 105 comprises a control means 111 and an evaluation means 123 and is supplied with power via the two-conductor connection 130. The two-conductor connection 130 can also be used for transferring data, for example so as to pass on the detected level to a central control room (not shown in FIG. 1). The angle ranges 101, 102, 103 should be considered examples of settable primary radiation directions and/or primary receiving directions. For each detected echo curve, the distance from the associated point on the surface of the bulk material 104 or filling material 104 is detected. By numerically integrating these distance values and postulating a planar surface 106, in particular a planar container base 106, below the bulk material 104 or filling material 104, the volume of the bulk heap 107 can be determined. The bulk heap 107 or bulk material heap 107 is a heap which is formed by the bulk material 104 when the bulk material 104 is filled into the container 131. If the density of the bulk material 104 is known, after detecting the progression of the surface 120 of the bulk material 104, the mass of the bulk material can be calculated. Further, it may be possible to determine a fill level of the bulk material 104 within a container 131, for example by averaging a plurality of detected distances.

The level measuring instrument 105 comprises the antenna mounting 108 comprising the antenna base 109 for fastening an antenna 201, 203 or antenna device 201, 203. Depending on the configuration of the level measuring instrument 105, the antenna base 109 may make possible mechanical adjustment of a primary radiation direction of an antenna device 201, 203 which is attached to the antenna base 109, for example by rotating the antenna mounting 108 about an axis of rotation and/or by tilting through a tilt angle 122. The rotation is indicated by the arrow 110, and the tilting is represented by the arrow 122.

In addition or as an alternative to the mechanical rotation 110 and/or the tilting 122, the primary receiving direction 101, 102, 103 of the antenna 201, 203 or antenna device 201, 203 can be supplemented or replaced by digital beamforming methods. In FIG. 1, the direction for which an echo curve is actually calculated at a predeterminable angle to the antenna base 109 may be referred to as the primary receiving direction 101, 102, 103. For each measurement, a plurality of primary receiving directions may be determined. So as to be able to scan the surface 120 of the bulk material 104 or another object 104, a transmitted signal is transmitted by a transmission means of the antenna device in substantially all spatial directions. In effect, the region of interest is illuminated by a monopole. By evaluating the signals received by the receiving means of the antenna device, a received signal in any desired spatial direction 101, 102, 103 can be determined. Thus, using just one measurement, a received signal can be formed in the different angle ranges 101, 102, 103 so as to detect the surface 120 of the bulk material 104 in the different angle ranges. By detecting a received beam in the different angle ranges, a received signal can be passed over the surface 120 of the filling material. To detect the different spatial ranges, digital beamforming (DBF) methods may be used, and the surface 120 of the bulk material 104 can be scanned substantially without mechanical angle adjustment 122 or rotation 110.

To make digital beamforming possible, an antenna device 201, 203 comprising a plurality of transmission means and receiving means, which is attached to the antenna support 109 or the antenna base 109, may be used.

Figure 2:
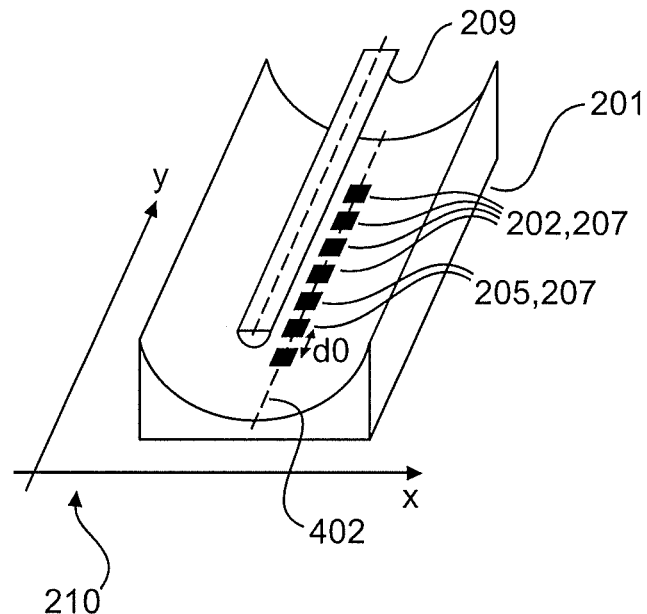
FIG. 2 is a perspective view of a linear parabolic antenna device in accordance with one embodiment of the present invention.

FIG. 2 is a perspective view of a linear parabolic antenna device 201 in accordance with one embodiment of the present invention. Since the transmission means 202 and the receiving means 205 are arranged linearly in parallel with the y-axis shown in FIG. 2 of the coordinate system 210 denoted by reference numeral 210, the antenna device 201 may be referred to as a linear array 201. The combination of the transmission means 202 and receiving means 205 may be referred to as an antenna array. The transmission elements 202 or transmission means 202 are actuated by the control means 111, and the receiving elements 205 or receiving means 205 are operated by the evaluation means 123, so as to achieve a desired beam form and so as to be able to scan a surface 120 of the bulk material 104 in a predeterminable region. In combination with the rotatable antenna mounting 108, the parabolic groove 201 or the linear array 201 can be used whilst mounted on the antenna support 109. The linear array 201 may provide mechanical focussing of the electromagnetic waves emitted by the transmission means 202 or antenna elements 202 and/or received by the receiving means 205, in the x-direction shown in the coordinate system 210. For mechanical focussing, a linear lens 209 or a linear hyperbola 209 is provided. By contrast, the corresponding signals are only focussed in the y-direction of the coordinate system 210 or in the linear direction 402 once the received signals have been detected within the evaluation unit 123 or evaluation means 123, by digital beamforming (DBF). In this way, the primary receiving direction of the antenna 121 can also be selectively controlled in the y-direction. Instead of pure transmission means 202 and pure receiving means 205, transceiver means 207 may also be used, which can transmit and also receive in the same position. Transmission means 202, 204 and receiving means 205, 206 can be replaced with transceiver means 207. The individual transmission means 202, 204, 207 and/or receiving means 205, 206, 207 are at a distance $d_0$ from one another and are orientated on a grid.

Figure 3:
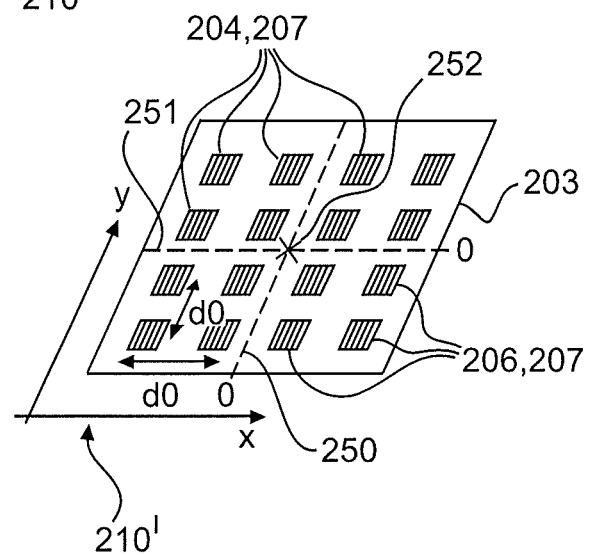
FIG. 3 is a perspective view of a two-dimensional antenna array in accordance with one embodiment of the present invention.

FIG. 3 shows a two-dimensional (2D) antenna array 203 in accordance with one embodiment of the present invention. The two-dimensional antenna array has an expanse in two spatial directions, for example in the x-direction and the y-direction, as indicated by the coordinate system 210'. FIG. 3 shows the arrangement of the transmission means 204 and the receiving means 206 on the antenna array 203. Instead of pure transmission means 204 and pure receiving means 206, transceiver means 207 may be used, which can transmit and at the same time also receive in the same position. The individual transmission means and/or receiving means are at a distance $d_0$ from one another. An antenna array 203 may be used in combination with a rigid antenna mounting 108 and a rigid antenna support 109. In combination with the static antenna mounting 108, the two-dimensional antenna array 203 may make scanning in two spatial directions possible in spite of a static arrangement. The two-dimensional antenna array 203 comprises a plurality of transmission means 204 and/or receiving means 206 along the x-axis and along the y-axis. These are arranged symmetrically about the axes of symmetry 250 and 251. The transmission means 204, 207 and receiving means 206, 207 are arranged in a grid shape and at a grid distance $d_0$. It may also be provided to implement a plurality i of different grid distances $d_i$, which differ from the base distance $d_0$, within a transmission means 204, 207 and/or receiving means 206, 207, in such a way that at least one subset of the means are arranged at irregular distances. Adhering to the distance of $\lambda/2$ predetermined by the distance criterion can reduce grating lobes. A correspondingly loaded program, which is set up for actuating and/or evaluating the two-dimensional antenna array 203 or the linear antenna array 201, links the signals received by the receiving means 205, 206, 207 by the two-dimensional digital beamforming method or the linear digital beamforming method and in accordance with the used antenna construction 201, 203. As a result of this linking and signal processing, the receiving directions can be made to deviate both along the x-axis and along the y-axis in a controlled manner. The primary receiving direction may refer to the direction in which an antenna radiation pattern generated by the antenna device 201, 203 has a primary lobe. This may mean that the greatest sensitivity of the antenna is present in the direction of the primary radiation direction, of the primary receiving direction or of the primary lobe of the antenna radiation pattern, and that this direction is therefore referred to as the primary radiation direction and/or primary receiving direction.

Signals are also received outside the primary receiving direction via side lobes, but with a much higher attenuation than in the primary receiving direction. The primary receiving direction and in particular the primary lobe of the antenna radiation pattern can be changed by the digital beamforming method.

So as to achieve the digital beamforming, as an alternative to the time-multiplexing method, a specially coded transmitted signal, for example an orthogonal signal form, may be used. If a coded transmitted signal is used to distinguish individual transmitters 202, 204, in particular to distinguish individual transmission positions, the transmission means 202, 204 may be excited in transmission simultaneously. As a result, a measurement cycle can be made shorter. The coding makes it possible to determine the position of the signal source in spite of the simultaneous transmission, so as to be able to distinguish the signals generated by each individual one of the transmission means 202, 204. Both the time-multiplexing method and the coding can be used to assign a received signal unambiguously to a particular transmission means 202, 204, 207 of the plurality of transmission means 202, 204, 207.

Grating lobes occur in an antenna radiation pattern as further sensitive spatial directions in addition to a primary radiation direction or primary receiving direction, and can lead to signal interferences, since it cannot be precisely distinguished whether a signal is radiated in from a primary receiving direction or from the grating lobe. Interferences are not sufficiently attenuated when grating lobes form. Grating lobes can thus be understood to mean that there is no unambiguous primary receiving direction in the antenna radiation pattern generated by digital beamforming, meaning that a corresponding antenna device may not be focussed in a specific direction. So as to avoid undesirable grating lobes of this type, when the digital beamforming method is used, the physical distance $d_0$ between two adjacent antenna elements 202, 204, 205, 206, 207 may be selected so as to be less than or equal to half the wavelength of the used radar signals, transmitted signals and/or received signals. As a result of the radar signals in the range of 79 GHz used in level measurement technology, this limitation may lead to distances of $d_0=3.975$ mm between the antenna elements 202, 205, 204, 206, 207 and to a high number of antenna elements 202, 205, 204, 206 if an antenna has an expanse of typically 100 mm. Adhering to the distance criterion using physical components can lead to high manufacturing costs. A large number of transmission means 202, 204, 207 and/or receiving means 205, 206, 207 in an antenna device 201, 203 may also lead to high circuitry complexity and thus to high manufacturing costs for an antenna device 201, 203 and a level measuring instrument 105.

Moreover, if individual transmission elements 202, 204 are used with time-multiplexing, because of the limited performance of available semiconductor components, level measuring instruments 105 can only emit towards the bulk material 104 at a limited transmission power. During the emission, digital beamforming is still not taking place, and so the entire surface 120 of a bulk material or object 104 has to be irradiated or illuminated by the transmission means 202, 204, 207. If a bulk material having poorly reflective medium properties is to be measured using weak radiation of this type, a signal reflected by this bulk material 104 may be so weak that detection is substantially no longer possible.

So as to make possible a small construction of an antenna device 201, 203 and emulate an additional antenna, a special arrangement of the transmission means 202, 204 and receiving means 205, 206 is selected.

Figure 4:
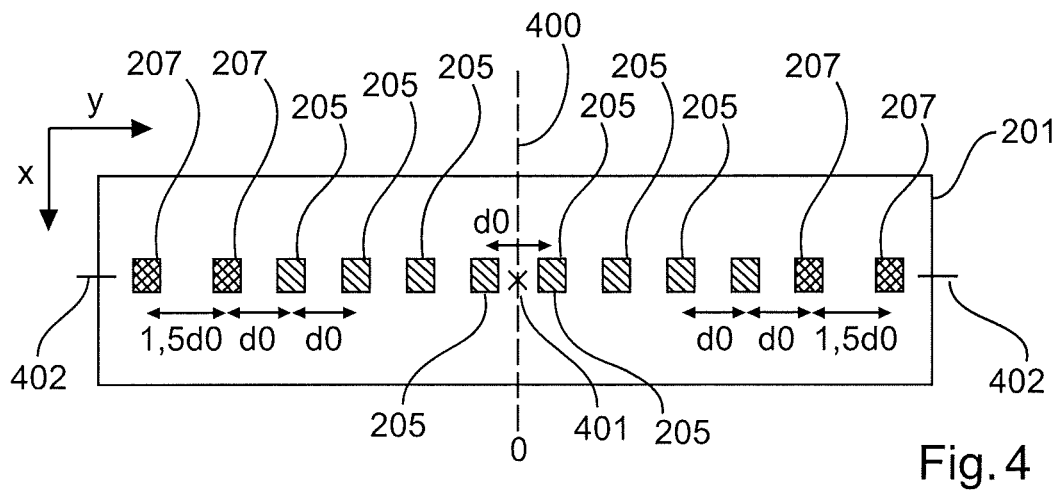
FIG. 4 shows an antenna device comprising linearly arranged transmission means and transceiver means in accordance with one embodiment of the present invention.

FIG. 4 is a plan view of an antenna device 201 or of a physical array 201 having linearly arranged transmission means 202 and transceiver means 207 in accordance with one embodiment of the present invention. The transceiver means 207 are used instead of pure receiving means 206, which can only receive. The transceiver means 207 may be operated either as transmission means 202 or as receiving means 205 according to the actuation thereof. Thus, the antenna device 201 could also be constructed merely of transceiver means 207, of which some are operated as transmission means 202 and others as receiving means 205. As a result it may be possible to change the arrangement of the transmission means 202 and receiving means 205 or 207 and 206 in the array 203 electronically.

The transceiver means 207 and receiving means 205 are arranged in a rectangular parabolic groove linearly with respect to a reference line 402 in the y-direction. The y-direction extends in parallel with the longer ones of the four sides of the rectangular linear antenna. The transceiver means 207 and receiving means 205 are arranged on a grid which is based on the used wavelength of the transmitted signals. The predeterminable positions of the transceiver means 207 and receiving means 205 are determined by the grid. The distance $d_0$ between two adjacent elements, in other words between receiving means 204, 206, between transmission means 202, 205 and/or transceiver means 207 is substantially one wavelength or $d_0=\lambda$. Starting from the reference point 401 on the reference line 400, the first two receiving means 205 are located symmetrically about the reference line 400 and are arranged in positions at $d_0/2$ and $-d_0/2$ and/or at $\lambda/2$ and $-\lambda/2$. The grid dimension is $d_0/2$ or $\lambda/2$, but not all grid positions are occupied by elements 202, 204, 205, 206, 207. The reference line 400 is an axis of symmetry 400 for the antenna device 201. The next two receiving means 205 are located at $3d_0/2$ and $-3d_0/2$. The next two receiving means are located at $5d_0/2$ and at $-5d_0/2$, and the outermost receiving means 205 are located at $7d_0/2$ and $-7d_0/2$. Thus, adjacent receiving elements 205 are at the regular distance $d_0$ or $\lambda$.

At the transition from the receiving means 205 to the transceiver means 207, adjacent elements are also at the distance $d_0$. Transceiver means 207 are located at the predeterminable positions $9d_0/2$ and $-9d_0/2$ or $9\lambda/2$ and $-9\lambda/2$. The outermost transceiver means 207 are located at the predeterminable positions $12d_0/2$ and $-12d_0/2$ or $12\lambda/2$ and $-12\lambda/2$, and thus deviate from the regular distances.

The two-dimensional physical array 203 from FIG. 3 comprises a corresponding regular construction, which is orientated on the reference line 250 in the x-direction and on the reference line 251 in the y-direction, making it possible for a reference point 252 to be provided at the centre of gravity of the surface of the antenna array.

It can be seen from FIG. 3 and FIG. 4 that no physical transmission means 202, 204, no physical receiving means 205, 206 and no physical transceiver means 207 are arranged at each of the reference points 401, 242. FIG. 4 thus comprises a linear antenna array having eight receiving means 205 and having four transceiver means 207. The transceiver means 207 may be actuated in such a way that they can be used both as transmission means 202, 204 and as receiving means 205, 206.

Figure 5:
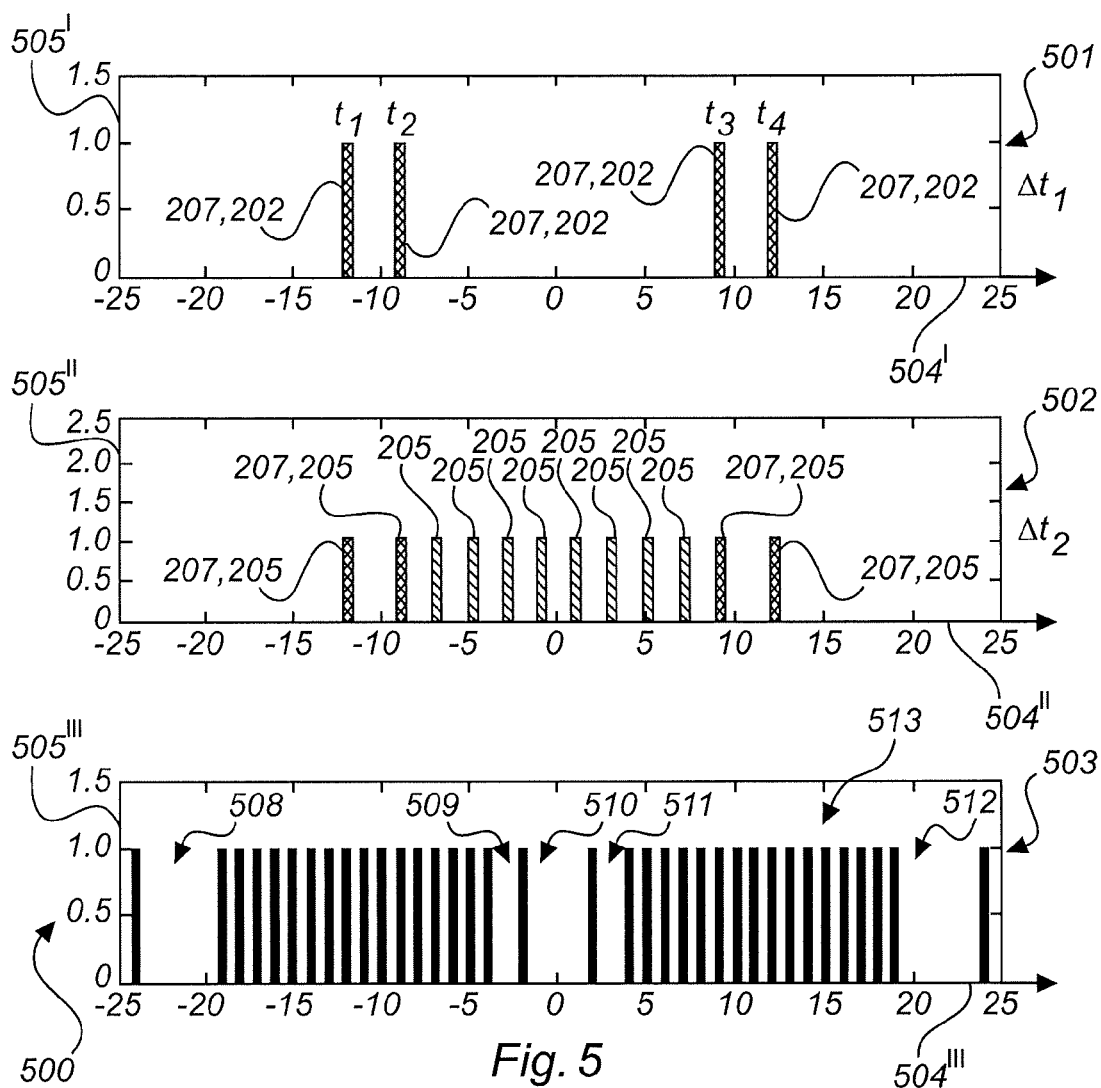
FIG. 5 shows various phases of a simulation program for forming a virtual array for the antenna device operated in time-multiplexing operation from FIG. 4, for better understanding of the present invention.

FIG. 5 shows an excerpt from a simulation program 500 which specifies the different phases of a time-multiplexing method which is used on the antenna device 201 from FIG. 4, for better understanding of the present invention. FIG. 5 shows both the phase $\Delta t1$ of actuating transmission means 202, 207 using a control means 111 and the phase $\Delta t2$ of receiving and/or evaluating using an evaluation means 123. In the receiving phase $\Delta t2$ shown in the graph 502, the receiving means 205, receiving patches 205 are activated, or the transceiver means 207 are switched into a receiving mode. It should be noted that the graphs 501, 502, 503 comprise a plurality of moments t1, t2, t3, t4 in a first time scheme of a measurement cycle. At each moment t1, t2, t3, t4, a different transmission means 202 is activated. The moments within the first time scheme are adapted to one another in such a way that different transmission means 202, 207 are not activated simultaneously, since the individual transmission means 202, 207 are operated substantially in succession. Instead of four transmission means 202, 207, as shown in FIG. 5, it is also possible to use at least two transmission means 202, 207. The respective moments $\Delta t1$ of the transmission graph 501 and $\Delta t2$ of the receiving graph 502 are separated in time by an interval corresponding to approximately double the signal transit time, since the transmitted signal shown in the transmission graph 501 is initially emitted towards the measurement object 104 and reflected by the measurement object 104 before being received by a receiving means 205, 207. For the sake of simplicity, it can be assumed that the signals of the transmission graph 501 and the receiving graph are present substantially simultaneously.

Using the co-array graph 503, FIG. 5 shows how a virtual array 513 or co-array 513 is formed by actuating and evaluating the transmission means 202 and receiving means 205 and the transceiver means 207.

In the graphs 501, 502, 503, the x-axes 504', 504", 540'" are calibrated as spatial axes, and thus specify the positions of the respective receiving means 205 or transceiver means 207. The unit of measurement for the transmission position 504' and for the receiving position 504" as well as for the position of the virtual array or co-array 504'" is calibrated in $\lambda/2$ or scaled to this value. The y-axes of the graphs 501, 502, 503 specify weighted signal powers of the transmitted signals 505', the received signals 505" and the co-array signals 505'".

Although in FIG. 5 the graphs 501, 502, 503 show a weighted transmission power 505', 505", 505'" of the transceiver means 207 and receiving means 205, these powers may be considered representative of the physical transmission means 202, receiving means 205 or transceiver means 207 which are actually present. Therefore, the bars shown in the graphs 501, 502, 503 may also be referred to as transmission elements 202, receiving elements 205 and/or transceiver elements. The positions correspond to the positions of the elements 202, 205, 207 of the linear antenna which are correspondingly shown in FIG. 4. However, FIG. 5 shows the time control and time evaluation of the associated physical elements. In the following, for referring to the power progressions over time in the graphs 501, 502, 503, the same designation may be selected as for the arrangement of transmission means 202, receiving means 205 and transceiver means 207 of the corresponding elements from FIG. 4. Therefore, the time and intensity graph 501, 502, 503 may be referred to as an antenna arrangement or as an antenna array.

The transmission graph 501 shows the arrangement of transceiver means 207 of an antenna device 201. The transceiver means 207 are actuated as transmission means 202 at the moments t1, t2, t3, t4 which are shown in the graph 501. The four transmission means 202 are activated sequentially or in succession in a time-multiplexing method. In this time-multiplexing method, it is provided for each transmission means 202 or for each transmission element 202 to become active at different moments t1, t2, t3, t4 within the first time scheme, in accordance with the own time scheme thereof. In FIG. 5, the graphs 501, 502, 503 represent a complete measurement cycle of the time-multiplexing method, without showing in detail the individual actuations during the different moments t1, t2, t3, t4 in the transmission phase $\Delta t1$ and in the receiving phase $\Delta t2$.

So as to reach the progression shown in the simulation graphs 500, the temporal sequence provides exciting the transceiver means 207 in position $-12\lambda/2$ in transmission at the moment t1 within the first time scheme. At this moment t1, all of the receiving means 205 as well as the transceiver means 207 in the currently active transmission position $-12\lambda/2$ are simultaneously set to receive, since the transmission means in this position is currently activated to transmit. At the moment t2, the second transceiver means 207 in position −9λ/2 are activated. As a result of being activated, the second transceiver means 207 in position −9λ/2 will likewise receive simultaneously together with the receiving means from the receiving graph 502. Thus, in turn only the activated transceiver means in position −9λ/2 is set to receive, whilst the transceiver means 207 in positions −12λ/2, +9λ/2 and +12λ/2 are blocked as a result of the transmission pause of the associated transmission means. Pure receiving means always receive. During this moment t2, the evaluation means 123 assigns the received signals to the second transmission means at −9λ/2, taking into account the time scheme. Subsequently, at the moment t3, the transceiver means 207 in position +9λ/2 is activated within the first time scheme, and at the same time as the moment t3, together with all receiving means 205, the transceiver means 207 used for transmitting at +9λ/2 also receives. The transceiver means at −12λ/2, −9λ/2 and +12λ/2 are deactivated or not switched into receiving mode at the moment t3 within the first time scheme, since they do not transmit during t3. At the moment t3, the signal is merely received by the transceiver means 207 in position 9λ/2 and the pure receiving means 205. The received signals received at moment t3 are assigned by the evaluation means 123 to the transmission means at +9λ/2, which are excited in transmission. At the end of the measurement cycle, at moment t4, the transceiver means 207 in position +12λ/2 are activated to transmit, and emit an electromagnetic signal which is received in the receiving phase Δt2, somewhat offset after the moment t4, by the pure receiving means 205 and the transceiver means 207 which are switched into receiving mode in position +12λ/2. The received signal is received substantially simultaneously, apart from a phase offset due to the different local arrangement of the individual elements 205, 207. The transceiver means at the positions −12λ/2, −9λ/2 and 9λ/2 are deactivated at the moment t4, since they are within a transmission pause at the moment t4.

At the end of a measurement cycle, in other words after the transmission at the moment t4, a co-array can be detected by using methods for forming co-arrays. It is found that this co-array 513 extends from the position −24λ/2 to the position 24λ/2 and is constructed substantially uniformly and in a comb shape. The virtual array 513 or the co-array 513 only has gaps in the region 508 from −23λ/2 to −20λ/2, in the region 509 at −3λ/2, in the region 510 from −1λ/2 to 1λ/2, in the region 511 at 3λ/2, and in the region 512 from 20λ/2 to 23λ/2. The virtual array 513 may be understood as the receiving property of the physical array 201 which corresponds to a physical array having the corresponding expanse from −24λ/2 to 24λ/2 and the corresponding gaps. The expanse of the array 513 is achieved merely by way of the type of actuation and evaluation of the individual elements 207, 205, 202.

Figure 6:
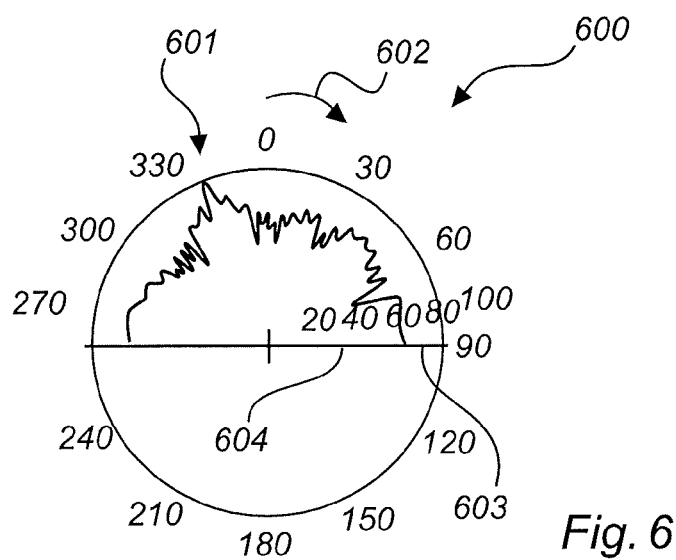
FIG. 6 is an antenna radiation pattern for the virtual array shown in FIG. 5, for better understanding of the present invention.

It can be seen in the co-array graph 503 that by comparison with the physical actual expanse of the physical array 201 having the elements 202, 205, 207 as shown in the transmission graph 501 and receiving graph 502, which extends from −12λ/2 to +12λ/2, there is an enlarged expanse or enlarged aperture from −24λ/2 to 24λ/2 for the virtual array 513. The calculation operation used for generating the virtual array 513 is for example a folding operation of the receiving positions shown in the receiving graph 502 with the respective transmission positions 207 shown in the transmission graph 501, which are activated at the corresponding moment t1, t2, t3, t4 in the associated time scheme. Because of the wide aperture of the virtual array 513, the antenna radiation pattern 600 associated with the virtual array 513 has good focussing in the primary radiation direction 601. Apart from the gaps, the distance criterion is met. However, as a result of the gaps 508, 509, 510, 511, 512, which are larger than λ/2, in directions other than the primary radiation direction or primary receiving direction, there are strong interferences, as can be seen from the antenna radiation pattern 600. Primarily, the aperture gaps 509, 510, 511 occurring in the central region of the virtual array 513 lead to a poor side lobe distance, as is shown in the antenna radiation pattern in FIG. 6. FIG. 6 shows an antenna radiation pattern 600 or an antenna characteristic 600 for the echo curve, which is generated synthetically by digital beamforming methods, of the primary receiving direction −20° 601 for the virtual array 513 shown in FIG. 5, for better understanding of the present invention. Antenna radiation patterns of this type can be determined for all primary receiving directions of interest.

The echo curves buffered by an evaluation means 123 and in a storage means can be arranged in a processor of the level measuring instrument 105 using methods for forming a virtual array in relation to a virtual array or a co-array 513. Digital beamforming methods can subsequently be applied to the echo curves of this virtual array. However, the gap 512 in the co-array, which is arranged or occurs in the centre at the zero point, can only achieve a low side-lobe suppression, as can be seen in the antenna characteristic FIG. 6, meaning that a high interfering portion is present outside the primary radiation direction 601.

Figure 7:
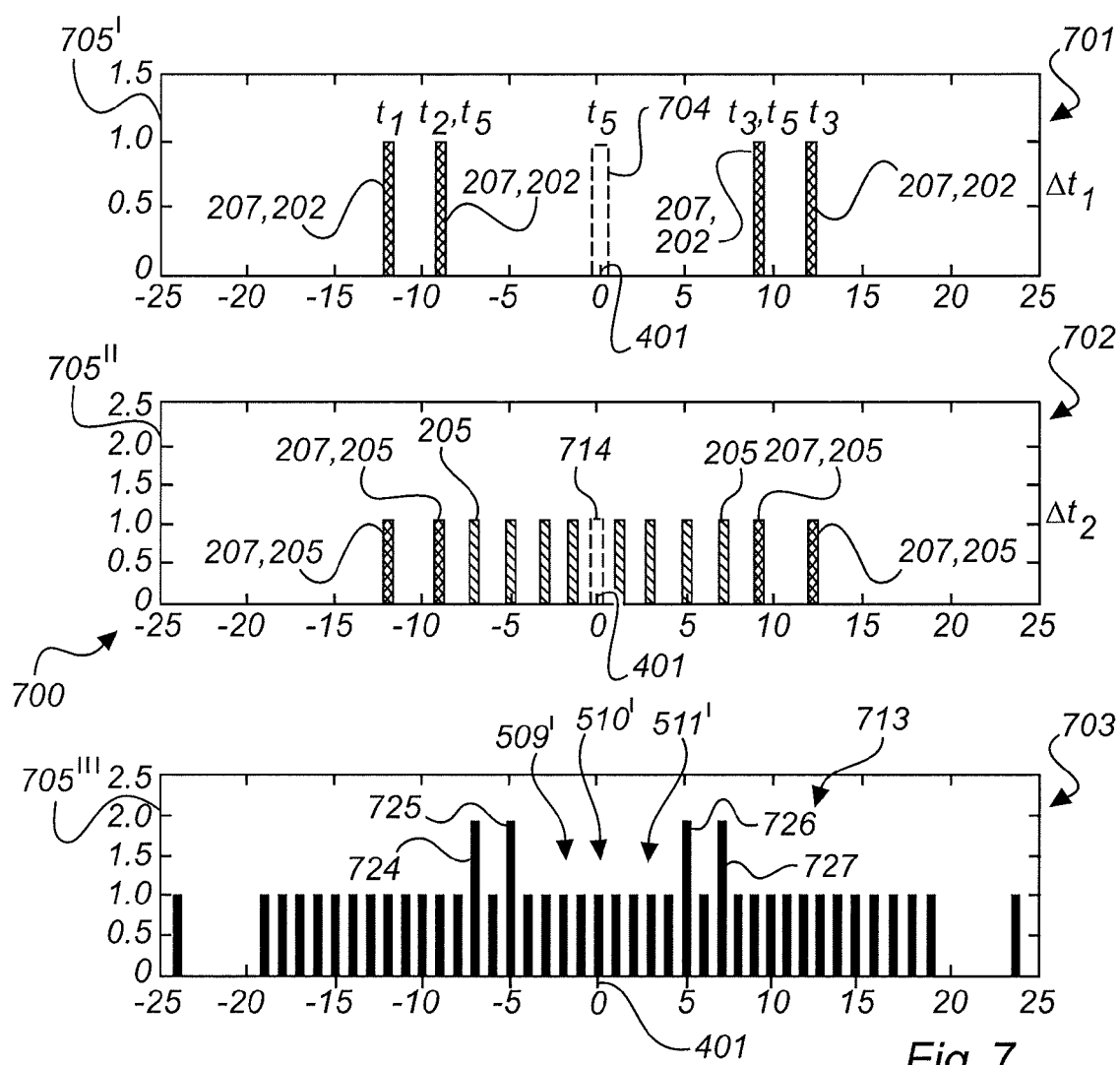
FIG. 7 shows various phases of a simulation program for forming a virtual array by emulating an additional transmission means using the antenna device from FIG. 4 in accordance with one embodiment of the present invention.

FIG. 7 shows simulation graphs 700 representing a time-multiplexing method for actuating the antenna arrangement 201 shown in FIG. 4 so as to emulate an additional antenna, in accordance with one embodiment of the present invention. The description of FIG. 5 is also substantially applicable to FIG. 7. In addition to the time sequence t1, t2, t3, t4 shown in FIG. 5, the measurement cycle formed by the time scheme shown in FIG. 7 is expanded by an additional time scheme. The additional time scheme is provided so as to excite a subset of the transceiver means 207 and/or a subset of transmission means 202 or a combination of transceiver means 207 and transmission means 202 simultaneously in transmission. Thus, a moment is provided at which at least two transmission means are excited simultaneously in transmission. At the moment t1, as is shown in the transmission graph 701, the transmission means 202 or the transceiver means 207, which is arranged in the position at −12λ/2, is activated to transmit within a first time scheme. By means of the receiving elements 205 shown in the receiving graph 702 and the transceiver means 207 which are set to receive, the reflection signal, which is offset by the signal transit time, is received substantially simultaneously with the transmission, as described previously in FIG. 5. The individual differences in the receiving moments of the individual transceiver means result from the different positions and the differences in signal transit times associated therewith. From these differences, the echo curves for the different spatial directions of the received signals can be determined. However, the received signals are substantially received simultaneously in the receiving interval Δt2.

After passing through the first time scheme t1, t2, t3, t4, in which the transmission means are alternately excited in transmission, a second time scheme follows. At the moment t5 in the second time scheme, a subset of the transceiver means 207 are simultaneously activated to transmit. In the example shown in FIG. 7, these elements 207 are the two transceiver means 207 located in the positions −9λ/2 and 9λ/2. These two transceiver means are a subset of the four provided transceiver means 207. Substantially at the moment t5, after taking into account a transit time, echo curves are in turn detected using all receiving means 205 and using the transceiver means 207 which are actually transmitting. Thus, in the receiving graph 702, Δt2, in addition to the receiving means 205, the transceiver means 207 in the positions −9λ/2 and 9λ/2 are also receiving. As a result of the equal distance of 9λ/2 between the simultaneously activated transceiver means 207, 202 in the positions −9λ/2 and 9λ/2, an emulated antenna 704 or a simulated transmission means 704 occurs precisely at the reference point 401. The additional echo curves generated by the simultaneous activation of the transceiver means 207 at the moment t5 substantially correspond to the echo curves which would be detected if an additional physical transmission antenna 704 were added in the position 0, 401 of the antenna device.

Since the transceiver means 207 in the positions −9λ/2 and 9λ/2 are also receiving during the moment t5, an additional virtual transceiver means 714 or an emulated transceiver means 714 which can receive is generated. The virtual receiving means 714 is generated because, by activating the transceiver means 207 at the moment t5 in the positions −9λ/2 and 9λ/2, which are arranged symmetrically about the position 0, the two transceiver means in the positions −9λ/2 and 9λ/2 are also switched into the receiving mode.

As is shown by the calculation of the virtual array 713 in graph 703, in addition to the expansion of the virtual expanse of the virtual array 713, which extends from the position −24λ to 24λ, the gaps 509', 510', 511' in the centre of the co-array 713 are closed. However, as a result of the additionally determined echo curves, which are brought about at the moment t5 in the at least two active transceiver means 207, 202 in the positions −9λ/2 and +9λ/2, multiple occupancies 724, 725, 726, 727 are generated at some positions in the virtual co-array. These multiple occupancies 724, 725, 726, 727 are shown in the co-array graph 703 with a weighting of 2. The co-array graph 703 shows the calculated virtual array 713. This means that the method used for calculating the virtual co-array 713, which comprises at least one folding, results in a weighting of the received signal amplitudes which is greater than 1 in the positions −7λ/2, −5λ/2, 5λ/2 and 7λ/2.

Figure 8:
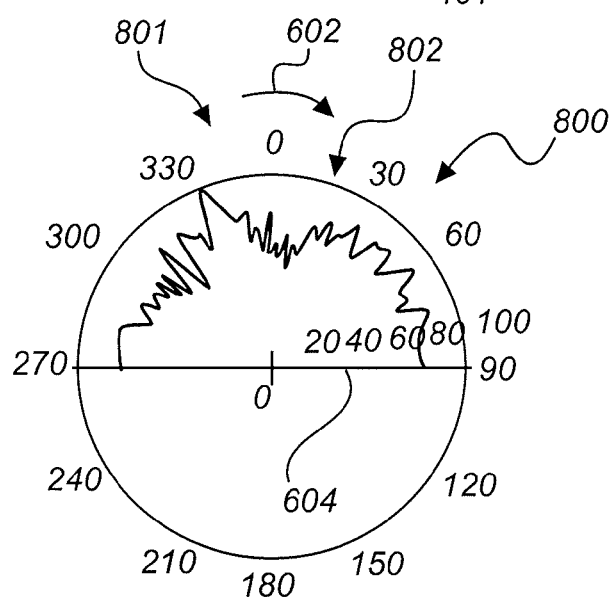
FIG. 8 is an antenna radiation pattern for the virtual array shown in FIG. 7 in accordance with one embodiment of the present invention.

FIG. 8 shows an antenna radiation pattern 800 which is generated for the antenna device 201 from FIG. 4 if at least two transmission means 202, 207 are additionally jointly activated in a time-multiplexing method. The primary lobe 801 can also be seen again in this antenna radiation pattern 800. The primary lobe 801 is directed in a primary receiving direction of −20 degrees. In the vicinity of the primary lobe 801, in particular in the polar direction 602, much less pronounced side lobes 802 are formed than in FIG. 6.

Figure 9:
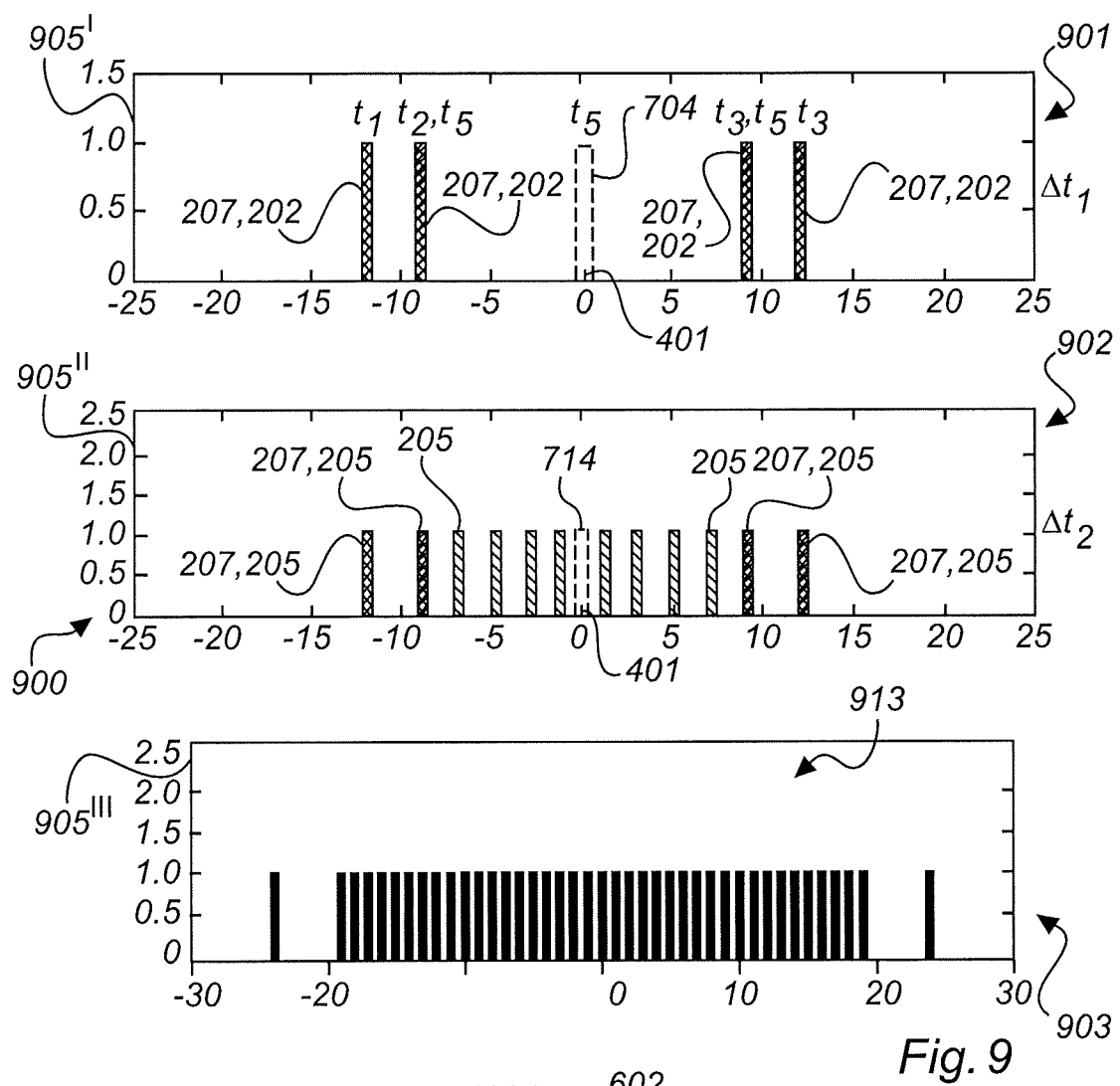
FIG. 9 shows various phases of a simulation program for forming a virtual array by emulating an additional transmission means using the antenna device from FIG. 4 with a correction in accordance with one embodiment of the present invention.

FIG. 9 shows a time-multiplexing method with advance correction of a co-array weighting in accordance with one embodiment of the present invention. Like FIG. 7, FIG. 9 shows graphs 900 from the different phases of calculating a co-array 913 by means of various simulation results 901, 902, 903. The transmission graph 901 is shown at a transmission time Δt2, the receiving graph 902 is shown at a receiving time Δt2, and a calculated co-array 913 is shown in the co-array graph 903. The first time scheme of a multiplex method comprises the moments t1, t2, t3, t4, and a second time scheme comprises the moment t5. The first and second time schemes are applied on the transmitter side 901, Δt1. The respective transmitted signals influence the receiving properties on the receiving side 902, Δt2 for corresponding moments delayed by the transit time.

The transmission graph 901 corresponds to the transmission graph 701, and the receiving graph 902 corresponds to the receiving graph 702. The scalings 905' and 905" correspond to the scalings 705' and 705" and specify a weighting of the transmitted and received signals. As in FIG. 7, an additional virtual transmission means 704 and virtual receiving means 714 are created at the moment t5. By averaging or by targeted selection of an echo curve in each position, a uniform co-array 913 can be created. A uniform co-array 913 means that substantially all positions of the co-array 913 have a weighting of the factor 1, as is shown by the scaling 905''', which corresponds to the scaling 705'''. In addition to the averaging or by targeted selection of an echo curve, a tapering method, for example Hamming, Tylor or Blackman, can be applied to the generated co-array 913. However, for this purpose, the echo curves received using the receiving means 205 or transceiver means 207 shown in the graph 905" and the echo curves received using the virtual receiving means 714 and having a weighting greater than 1 in the representation of the co-array occupancy 713 but assignable to the same co-array position are averaged. This results in a uniform co-array occupancy, which is visualised in the drawing 903. Subsequent to this step, tapering can be provided, in which the echo curves of the virtual array are weighted according to the virtual position thereof using a tapering function. The tapering is used in addition to the digital beamforming. In addition, it is possible to activate a plurality of transmission elements 207, 202 or all transmission elements 207, 202 simultaneously at any desired moment so as to increase the radar energy emitted towards the filling material. By activating the transmission means 202, 207 simultaneously, echo signals can be detected reliably even for poorly reflective media or unfavourable bulk material positions, and the topology measurement can thus be plausibility-checked. However, detailed evaluation of the progression of the surface and the formation of virtual arrays is only possible to a limited extent, since only a limited part of the surface of the bulk material can be irradiated with the increased transmission energy.

The plausibility measurement may be a pure distance measurement or a pure level measurement in a single spatial direction, for example perpendicularly to the filling material surface. The plausibility measurement may for example be carried out as a further additional time scheme at a moment t6 after each measurement cycle comprising the times t1, t2, t3, t4 and t5. In another example, the plausibility check may be inserted after a predeterminable number of completed measurement cycles as a correction and plausibility measurement. In yet another example, the plausibility check may be carried out if a quality measure is undershot. All time schemes may be periodic signal progressions which run in parallel with one another. If the results of a level measurement by means of the topology measurement using a time-multiplexing measurement and the additional activation of at least two transmission means differ from the results obtained in the normal bulk material measurement with simultaneous activation of the transmission means by more than a previously defined tolerance threshold, the topology measuring instrument 105 can generate a warning message and switch to a pure level measurement operation. When switching to a pure level measurement operation, the evaluation and actuation method of the antenna device 201 may be changed.

Figure 10:
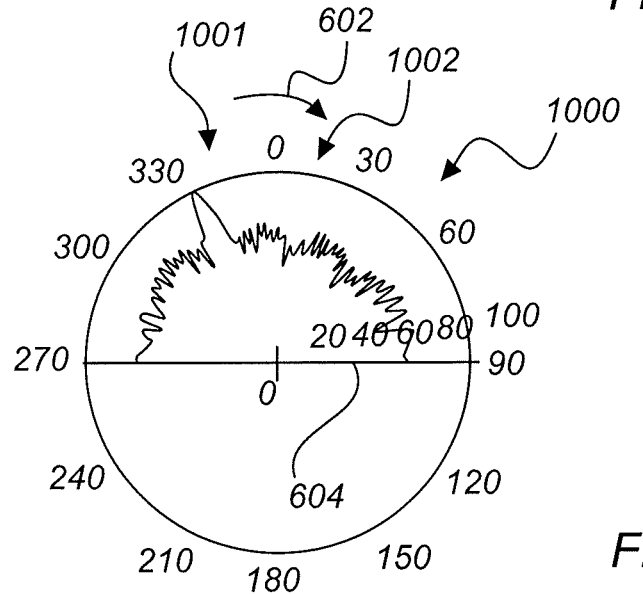
FIG. 10 is an antenna radiation pattern for the virtual array shown in FIG. 9 in accordance with one embodiment of the present invention.

FIG. 10 shows an antenna characteristic 1000 which can be generated using the virtual array 913, in accordance with one embodiment of the present invention. The antenna characteristic 1000 exhibits good focussing in the primary radiation direction 1001 or primary receiving direction 1001 at −20° and a small expanse of the side lobes 1002 in the polar direction 602. As a result of the good focussing and the low interference, good determination of the bulk material surface and thus good calculation of the topology of the bulk material can take place, and this in turn makes it possible to achieve a good level measurement.

Figure 11:
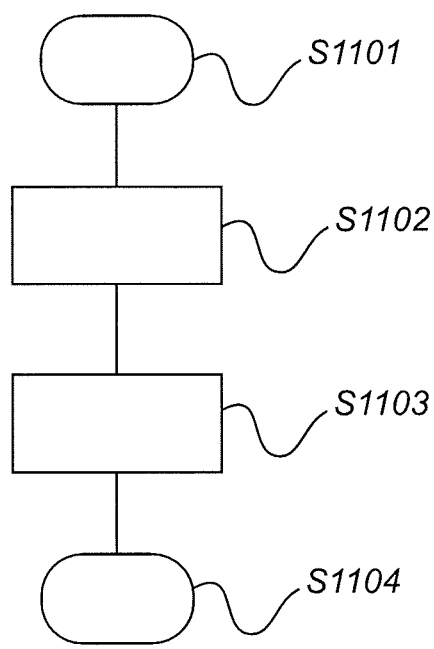
FIG. 11 is a flow chart for a method for operating an antenna device in accordance with one embodiment of the present invention.

FIG. 11 is a flow chart of a method for operating an antenna device from FIG. 4 in accordance with one embodiment of the present invention. The method starts at step S1101, and in step S1102 excites at least two transmission means alternately in such a way that each of the at least two receiving means 205, 207 receives a transmitted signal generated by each of the at least two transmission means 207, 202. The alternate excitation or sequential excitation corresponds to the moments t1, t2, t3 and t4 shown in FIG. 5, FIG. 7 and FIG. 9 in the transmission graphs 501, 701, 901. In step S1103, at a moment t5, a subset of the provided transmission means 207, 202, for example the at least two transmission means 207, 202 in the positions 9λ/2 and +9λ/2 are simultaneously and uniformly excited in transmission. The uniform excitation means that each of the receiving means 207, 205 receives the additional signal of this virtual transmission means 704, which is generated at the moment t5, in different positions, as is shown for example in the graphs 505", 702 and 905". In addition, a virtual receiving means 714 which is generated receives additional received signals which can be used to determine a virtual array 913. The position of the virtual transmission means 704 occurs in a predeterminable position 401, for example in the centre 401 of an antenna device 201.

After passing through a measurement cycle comprising the moments t1 to t5, the method ends in the state S1104.

For the sake of completeness, it should be noted that "comprising" and "having" do not exclude the possibility of other elements or steps, and "a" or "an" does not exclude the possibility of a plurality. It should further be noted that features or steps which have been disclosed with reference to one of the above embodiments may also be used in combination with other features or steps of other above-disclosed embodiments. Reference numerals in the claims should not be considered limiting.

The invention claimed is:

1. An antenna device, comprising:
a controller; and
an antenna array comprising:
at least two transmission devices in first predeterminable positions,
at least two receiving devices in second predeterminable positions,
wherein the controller is configured to alternately individually excite the at least two transmission devices for transmission in such a way that each of the at least two receiving devices receives a transmitted signal generated by each of the at least two transmission devices,
wherein the controller is further configured to excite the at least two transmission devices jointly for transmission at a predeterminable moment, in such a way that each of the at least two receiving devices receives a transmitted signal generated by a single virtual transmission device, and
wherein the virtual transmission device is arranged in a predeterminable position which differs from the first predeterminable positions of the at least two transmission devices.

2. The antenna device according to claim 1, further comprising:
an evaluation device,
wherein the controller is further configured to determine the predeterminable moment by applying at least two different time schemes,
wherein the controller is further configured to excite the at least two transmission devices alternately in transmission in accordance with a predeterminable first time scheme in such a way that the transmitted signals generated by the at least two transmission devices are assignable to one of the at least two transmission devices when received by the at least two receiving devices,
wherein the controller is further configured to excite the at least two transmission devices jointly in transmission in accordance with a predeterminable second time scheme in such a way that the transmitted signals generated by the at least two transmission devices appear to originate from a single virtual transmission device when received by the at least two receiving devices at a predeterminable distance from the transmission devices,
wherein the evaluation device is configured to receive received signals via the at least two receiving devices while the predeterminable first time scheme is active and while the predeterminable second time scheme is active, and
wherein the evaluation device is configured to form an echo curve for a predeterminable spatial direction from the first predeterminable positions of the transmission devices and/or from the second predeterminable positions of the receiving devices using the received signals received during the predeterminable first time scheme and during the predeterminable second time scheme.

3. The antenna device according to claim 2, wherein the evaluation device is configured to form a virtual array from the antenna array.

4. The antenna device according to claim 2, wherein the total of durations from the predeterminable first time scheme and the predeterminable second time scheme determines the duration of a measurement cycle.

5. The antenna device according to claim 2, wherein the evaluation device is configured to weight the received signals; and/or
wherein the controller is configured to weight the transmitted signals.

6. The antenna device according to claim 2, wherein the evaluation device is configured to determine a level, a volume of an object, a mass of an object and/or a surface structure of an object.

7. The antenna device according to claim 1, wherein the first and/or second predeterminable positions of adjacent transmission devices and/or receiving devices are arranged at a distance which is less than or equal to half the wavelength of the used signals.

8. The antenna device according to claim 1,
wherein the at least two transmission devices are arranged with respect to a reference point, and wherein the virtual transmission device appears to be positioned at the reference point.

9. The antenna device according to claim 1, wherein the transmitted signals generated by the at least two transmission devices are each assignable to one of the at least two transmission devices by applying a time-multiplexing method and/or a coding method.

10. The antenna device according to claim 1, wherein the controller is set up to excite the at least two transmission devices using a frequency-modulated continuous wave signal.

11. The antenna device according to claim 1, wherein one of the at least two transmission devices and one of the at least two receiving devices are formed as joint transceiver device which is configured to both transmit a signal and receive a signal.

12. The antenna device according to claim 1, wherein the antenna device is configured as a two-conductor instrument having a power supply line also used for transferring data.

13. A level measuring instrument for determining a level and/or for determining a surface structure of an object, the level measuring instrument comprising an antenna device according to claim 1.

* * * * *